Dec. 25, 1928.
C. B. HENNING
HAND CULTIVATOR
Filed March 17, 1924
1,696,678
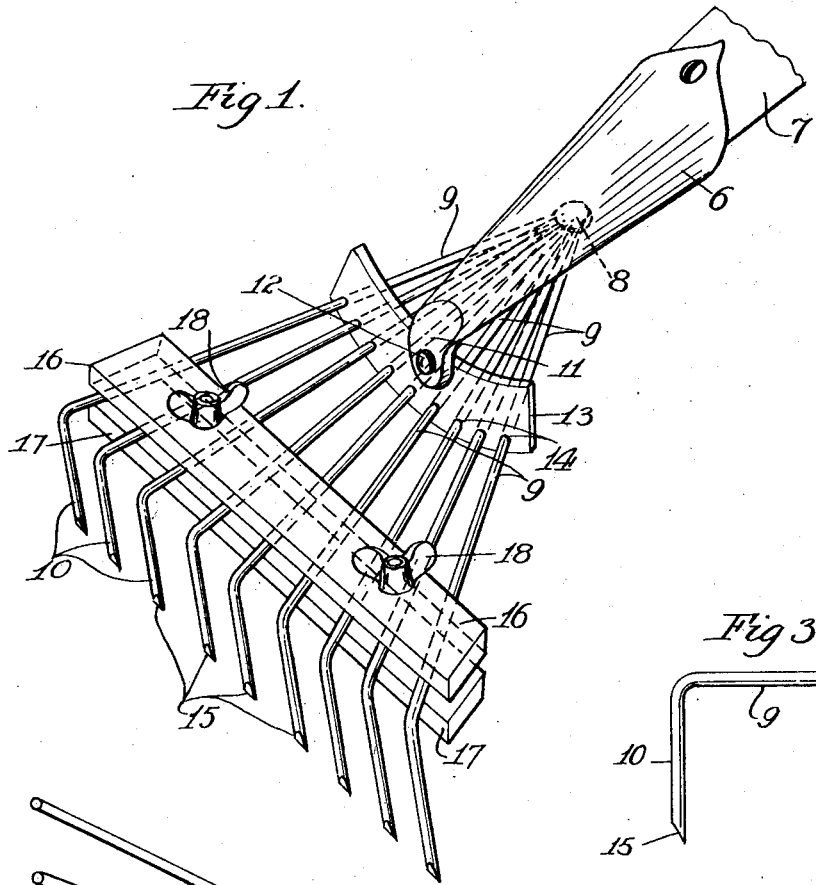
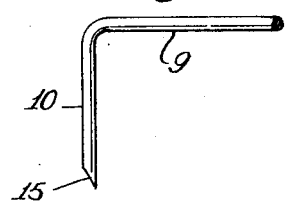
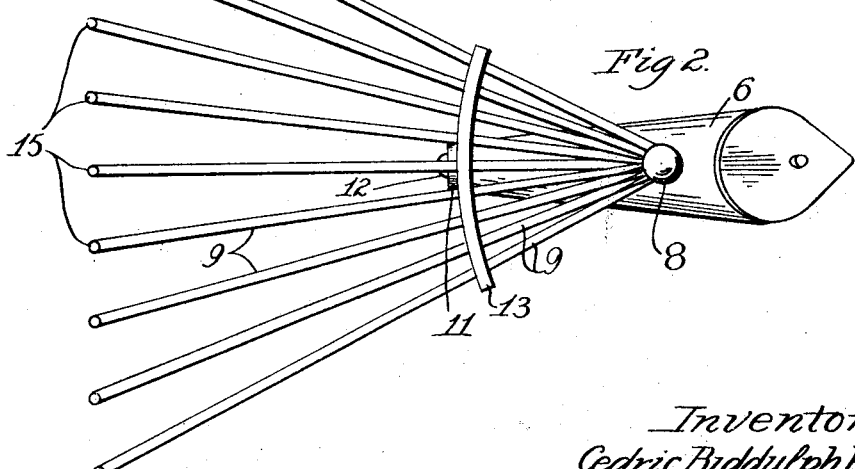
Witness.
N. F. McKnight
Inventor.
Cedric Biddulph Henning
by Burton & Burton
his Attorneys.

Patented Dec. 25, 1928.

1,696,678

UNITED STATES PATENT OFFICE.

CEDRIC BIDDULPH HENNING, OF HUNTERS HILL, NEAR SYDNEY, NEW SOUTH WALES, AUSTRALIA.

HAND CULTIVATOR.

Application filed March 17, 1924, Serial No. 699,680, and in Australia March 27, 1923.

This invention relates to improvements in hand cultivators and has been devised with the view to providing a light implement which can be effectively used either for hoeing or raking. It is especially adapted for breaking up soil and raking out the weeds therefrom.

Referring to the accompanying drawing in which

Figure 1, is a perspective view of the cultivator, and

Figure 2, an inverted plan view thereof, while

Figure 3, is a part side elevation of one of the tines.

6 represents the ordinary handle socket to which is attached a handle 7.

Towards the rear or handle end of said socket 6, is secured a headed stud, 8, around which are hooked the ends of a series of radially extending spring tines 9, of approximately equal length, and turned or curved downwardly at their outer or free ends as at 10, so as to form a convenient lineal or arcuate outer contour.

At the outer or forward extremity 11 of said socket 6, or on an extension thereof, is rigidly fastened or riveted, as at 12, a transverse bar or spacing piece 13. Said bar or spacing piece 13 is provided with holes or slots 14 equally spaced apart, in which the spring tines 9, passing in a radial direction from their approximate central point 8, are securely held in their desired dispositions. If required, the downwardly projecting ends of the spring tines may be cut or sharpened as at 15, so as to facilitate the disintegration of light soil, and in order to attain a greater penetrating effect the implement may be suitably weighted as by means of the plates 16 and 17 detachably secured to the tines 9 by means of the bolts and nuts 18.

I claim:

1. Improvements in hand cultivators comprising a handle, a socket attached thereto, a series of radially extending spring tines rigidly and permanently attached about a point towards the rear of said socket and all passing through a transverse bar or spacing piece rigidly attached at or about the forward end of said socket, said tines being turned downwardly at their free ends and a supplemental weight detachably secured to the tines between said spacing piece and their down-turned ends.

2. In a hand cultivator as described in claim 1, said weight comprising two members disposed respectively above and below the tines with clamping bolts extending through said members for securing them in position.

3. Improvements in hand cultivators, comprising a handle, a tapered socket adapted to receive the end of the handle, a stud projecting laterally from said socket; a plurality of spring tines engaged with said stud and extending radially therefrom past the smaller end of the socket, said socket having a laterally extending lug at its smaller end and a transverse spreader bar with spaced openings engaging the tines respectively, said bar being attached at the middle of its length to said lug on the socket.

In testimony whereof, I have hereunto set my hand, this eighth day of January, 1924.

CEDRIC BIDDULPH HENNING.